No. 732,783. PATENTED JULY 7, 1903.
J. W. ROWE.
VEHICLE BRAKE.
APPLICATION FILED OCT. 13, 1902.
NO MODEL. 2 SHEETS—SHEET 1.
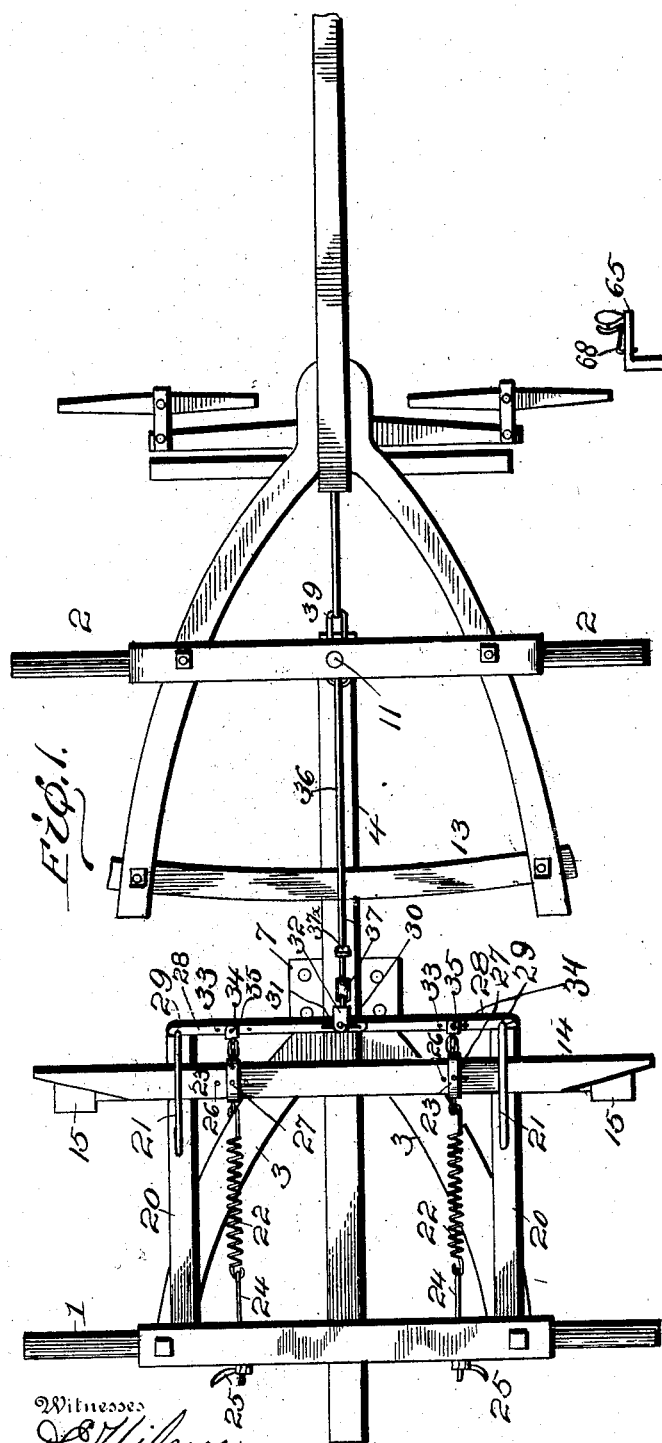
Witnesses
Inventor
John W. Rowe

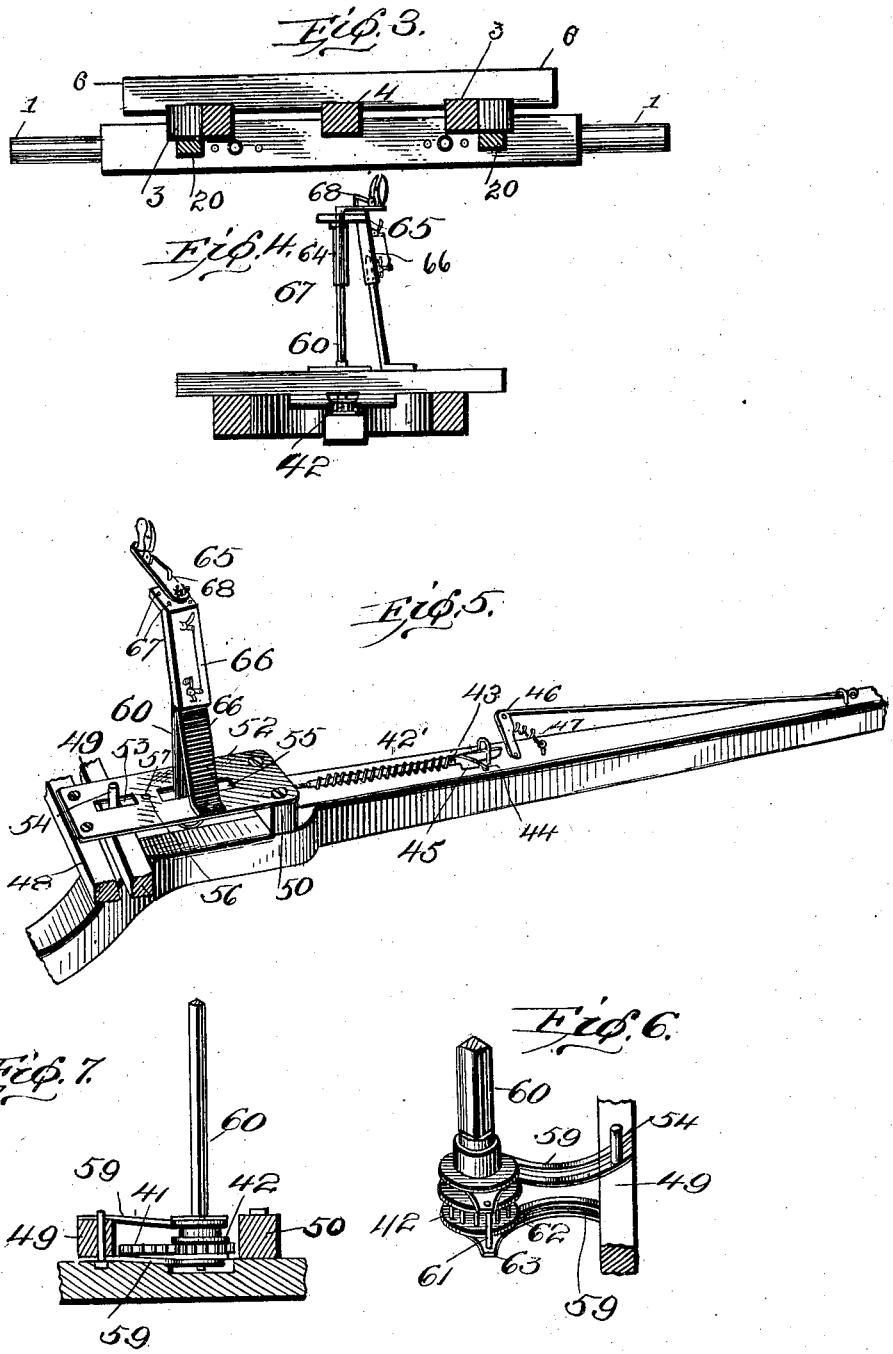

No. 732,783.

Patented July 7, 1903.

UNITED STATES PATENT OFFICE.

JOHN W. ROWE, OF CENTERTOWN, KENTUCKY.

VEHICLE-BRAKE.

SPECIFICATION forming part of Letters Patent No. 732,783, dated July 7, 1903.

Application filed October 13, 1902. Serial No. 127,105. (No model.)

*To all whom it may concern:*

Be it known that I, JOHN W. ROWE, a citizen of the United States, residing at Centertown, in the county of Ohio and State of Kentucky, have invented certain new and useful Improvements in Vehicle-Brakes; and I do hereby declare the following to be a full, clear, and exact description of the invention, such as will enable others skilled in the art to which it appertains to make and use the same.

This invention relates to certain new and useful improvements in automatic wagon-brakes; and it has for its objects, among others, to provide a simple and cheap construction of brake of this character which is entirely independent of the wagon-body and which can be readily adjusted to suit any required length.

A further object is to provide such a form of brake that will always be out of the way of the load and the parts so disposed that when either one of a draft-team pulls enough to move the unloaded wagon it will remove the brake-shoes from the wheels. By my construction should the load get against the brace in front of the wagon and spring it either forward or to either side it will not in any wise affect the working of the brake. The load cannot interfere with the perfect working of the brake, as I make the brace of spring-steel, and the staff of the cog-wheel does not extend farther back of the brace, and the staff of said cog-wheel is provided with a toggle-joint or universal coupling. The draft of the load is not upon any part of the brake, but on the wrench-pin, which remains in front of the doubletree, and hence the brake is as easy to throw off or on when the team is pulling as when it is standing still. The tongue can be easily removed when desired.

Other objects and advantages of the invention will hereinafter appear, and the novel features thereof will be particularly pointed out in the appended claims.

The invention is clearly illustrated in the accompanying drawings, which, with the numerals of reference marked thereon, form a part of this specification, and in which—

Figure 1 is a bottom plan of my improved brake. Fig. 2 is a vertical longitudinal section through the same. Fig. 3 is a vertical transverse section through the rear hounds. Fig. 4 is a vertical transverse section through the forward portion of the front hounds. Fig. 5 is a perspective detail of one form of operating means for the staff of the gear-wheel. Fig. 6 is a detail showing the connection of the staff of the gear-wheel. Fig. 7 is an enlarged vertical section through the front part of the hounds and the parts carried thereby.

Like numerals of reference indicate like parts throughout the several views.

Referring now to the details of the drawings, 1 designates the rear axle, and 2 the front axle.

3 designates the rear hounds, of ordinary construction, and 4 is the reach or coupling-pole, disposed in the usual manner, with its rear end slidably mounted in a recess 5 in the rear axle and beneath the rear bolster 6. The forward ends of the rear hounds are connected by the metallic strap 7, which provides a space within which the reach or coupling-pole 4 is received and guided. The reach or coupling-pole 4 is provided with a plurality of vertical openings 8 for the reception of a removable pin 9, which passes through the metallic plate 7 and is designed to hold the reach or coupling-pole in its adjusted position in a well-known manner.

The forward end of the coupling-pole 4 is disposed between the front axle and the front bolster 10 upon the king-bolt or wrench-bolt 11 in the usual manner. A bar 12 is shown in this instance as secured to the front hounds in vertical alinement with the front axle and through which the king-bolt 11 passes and upon which the front bolster 10 is mounted. The coupling-pole or reach 4 is guided between the front end and its connection with the rear hounds upon the curved connecting portion 13 of the front hounds, as clearly shown.

14 is the brake-beam, carrying at its opposite ends the brake-shoes 15, adapted to engage the peripheries of the rear wheels, and this brake-beam is mounted for movement in the direction of the length of the coupling-bar and is supported in the following manner:

16 is a transverse bar secured to the top of the rear hounds and is provided upon its upper face with a longitudinal groove 17, in which is seated the bar 18, held in any suitable manner, so as to rock therein, and this bar has the vertical depending portions 19, which extend down upon opposite ends of the bar 16 and are secured to the brake-beam in any suitable manner.

20 designates braces secured at their rear ends to the under sides of the rear hounds and extended beyond the bar 16 beneath the same and are provided upon their under sides with elongated loops or analogous devices 21, which receive and guide the brake-beam 14.

22 designates coil-springs having their forward ends attached to suitable means, as the clips 23, which embrace the brake-beam, and at their rear ends connected with bolts 24, mounted in the rear axle and provided with adjusting-nuts 25, whereby the tension of the springs may be readily adjusted. These nuts are preferably handle-nuts, whereby the tension of the springs can be readily adjusted without the employment of a wrench.

The clips 23 are made adjustable lengthwise of the brake-beam, so they may be moved either way thereon, the beam being provided with a plurality of holes 26 for this purpose to receive the movable pins 27. The bolts 24 may be likewise adjusted in the hind axle by providing the latter with a series of holes therefor, as is shown.

28 designates levers pivotally mounted on their outer ends upon the braces 20, as shown at 29, in this instance being shown as pivoted upon the front vertical portions of the loops 21. These levers are halved at their adjacent ends and overlapped, and the overlapped portions are provided with elongated slots 30, in which works the pin 31, upon which is pivotally mounted the clip or analogous device 32. The levers 28 are provided between their ends with a plurality of holes 33 to provide for the adjustment of the clips 34, which are removably secured thereon by means of the pins 35 engaging in the proper hole 33, and these clips are connected with the clips 23 by any suitable pivotal connection, as shown.

From the above description it will be seen that the lever power can be readily regulated as occasion may require. It will be noted that the brake-beam, while being mounted to rock on its support above described, is normally held rearward by the action of the springs connected therewith.

36 is an extension-bar of any suitable construction, connected with the clip or clevis which connects the adjacent ends of the levers 28, and this bar or rod extends beneath the portion 13 of the front hounds and serves to keep the same from dropping too low. This extension-bar has at the end nearest to said levers a series of links 37 of the same length as the distance from one hole to another in the coupling-pole or reach, so as to provide for lengthening of said extension-bar to suit any length of wagon-coupling. This extension-bar is held in line with and at proper distance from the coupling pole or rod by means of guide or eye 37× on the lower end of the bolt 38, held in said coupling-pole or reach and dependent therefrom, as shown, these bolts being held in the coupling-pole or reach so as not to turn therein. This extension-bar has at its forward end a link 39 for the king-pin to work through and to hold the extension-bar in place when the wagon is turning. The eye or thimble 39× at the front end of the coupling-pole serves to hold this coupling-pole up off of the link, and there is a staple 40 in the front axle to keep said long link from working down under said eye or cuff. The extension-bar has a cog-piece or rack 41, which works under the doubletree and which is adapted to engage with the cog-wheel 42, which will soon be described. The extension-bar has in front of the said rack-bar a coiled spring 42', which spring has a bar 43 extending within the same, as shown. This spring is fastened at its other end on the tongue 44 in any suitable manner, so it can be taken up or let out when desired. This spring is for the purpose of helping the team to pull the brake-shoes off of the wheels. This admits of the springs at the rear of the brake-beam being as strong as desired, and yet require but little draft at the doubletree to relieve the wheels of the brake-shoes. This bar is stapled to the tongue, so as to move back and forth thereon, and is provided with a stop-shoulder 45 to raise the bar. The lever 46 has a bar secured to its front end, that reaches to the end of the tongue, and to it the tongue-chains are secured. The rear end of this lever is stapled to the tongue. Under the front end of the lever there is a small spring 47 to raise said end of the lever above the level when the bar 43 in the spring 42 is drawn off of said lever. This lever is for the purpose of throwing off the power of the spring 42' when the springs 22, connected with the brake-beam, have drawn the bar in said spring off of the lever. Then the team holds back on the tongue-chains, and said lever will come in contact with said bar, and the full power of the springs 22 takes effect on the wheels.

48 is a stop bolted to the front hounds at a proper place to serve as a stop for the doubletree 49. This stop also serves as a brace for the hounds and answers the purpose of stay-chains. This stop is of substantially the same length as the doubletree, and therefore enables either one of a draft-team to relieve the wheels of the brake-shoes.

50 is a brace extending across the front end of the front hounds, to which it is secured, and it is provided in its under face with a notch or recess 51, in which the extension-bar is free to move. This brace-bar 50 serves in addition to bracing the front ends of the hounds as a stop to prevent the tongue from rising too high.

52 is a metallic brace connecting the front and rear brace-bars of the hounds. It is provided with a slot 53, extending lengthwise thereof, in which works a pin 54 on the doubletree, and with another slot 55, in which works the staff of the cog-wheel. Between these slots it is provided with a hole 56, in which is mounted the wrench-pin 57. The pin in the doubletree is for the purpose of holding the slide that works on the staff of the cog-wheel and to keep the doubletree from slipping endwise. Projecting from the under side of the tree are the bolts or pins 58 for the purpose of holding the end of the rack or cog-piece on the extension-bar to its place and also to prevent it from working too far backward and forward. The singletrees are attached to the doubletree, so they cannot drop down and rub the front wheel.

The cog-wheel 42 is disposed in front of the doubletree and is held a proper distance from the doubletree by two slides 59, disposed one above and the other below the same and which are engaged over the staff of the cog-wheel and working on the bolt extending upward from the doubletree. These pieces are slotted to receive the wrench-pin. The cog-wheel staff 60 has a ball-and-socket connection with the cog-wheel, and this staff is made rectangular in form for the said universal joint. The cog-wheel is held in engagement with the cog-piece or rack by means of the bolt 61, which projects downward from the ear 62 and engaged with the ear 63, said ears being carried by the flanges of the cog-wheel or by the hub thereof, this bolt in connection with the flanges of the cog-wheel serving as a guide in which the rack moves and by which it is held in engagement with the cog-wheel. The cog-wheel staff is provided with an extension 64 for the purpose of lengthening the staff of the cog-wheel as may be desired. The cog-wheel is designed to be rotated by a crank 65, secured on the top of the extension-staff and an extension-brace 66, the upper portion thereof being in the form of a long flat hollow piece with a square crook at the top, with a hole in the center to receive the extension-staff and small catch-slits 67 around its edge to receive the catch or pawl 68, carried by the crank. This serves the purpose of holding the cog-wheel and rack-bar in any position desired. This provides for the throwing off of the brake to back the wagon and to throw on the brakes when desired, so that the draft-team cannot pull the same off. It also provides for the raising of the crank to suit any height of load.

Modifications in detail may be resorted to without departing from the spirit of the invention or sacrificing any of its advantages.

What is claimed as new is—

1. In an automatic brake, the combination with the brake-beam and the springs acting thereon, of the levers connected with the brake-beam, the extension-bar, a rack connected therewith and a cog-wheel operatively connected with said rack.

2. In an automatic brake, the combination with the brake-beam and the springs acting thereon, of the levers connected with the brake-beam, the extension-bar, a rack connected therewith and a cog-wheel operatively connected with said rack and a spring connected with said rack.

3. In an automatic brake, the combination with the brake-beam and the springs acting thereon, of the levers connected with the brake-beam, the extension-bar, a rack connected therewith and a cog-wheel operatively connected with said rack and a doubletree movably mounted and connected with said cog-wheel.

4. In an automatic brake, the combination with the brake-beam and the springs acting thereon, of the levers connected with the brake-beam, the extension-bar, a rack connected therewith and a cog-wheel operatively connected with said rack, and a doubletree movably mounted and connected with said cog-wheel and a guide for said rack carried by the cog-wheel.

5. In an automatic vehicle-brake, the combination with the brake-beam, the levers connected therewith and the extension-bar connected with said levers and having a rack portion, of a spring connected with said rack portion, a cog-gear mounted for longitudinal movement on the tongue, means for rotating said gear and a doubletree movably mounted on the front hounds and connected with said gear.

6. In an automatic vehicle-brake, the combination with the brake-beam, the levers connected therewith and the extension-bar connected with said levers and having a rack portion, of a spring connected with said rack portion, a cog-gear mounted for longitudinal movement on the tongue, means for rotating said gear and a doubletree movably mounted on the front hounds and connected with said gear and a stop for said doubletree secured to the front hounds.

7. In an automatic vehicle-brake, the combination with the brake-beam, the levers connected therewith and the extension-bar connected with said levers and having a rack portion, of a spring connected with said rack portion, a cog-gear mounted for longitudinal movement on the tongue, means for rotating said gear and a doubletree movably mounted on the front hounds and connected with said gear and a stop for said doubletree secured to the front hounds, the connections between the cog-gear and the doubletree being slotted to receive the wrench-pin.

8. In an automatic vehicle-brake, the combination with the brake-beam, the levers connected therewith and the extension-bar connected with said levers and having a rack portion, of a spring connected with said rack portion, a cog-gear mounted for longitudinal movement on the tongue, means for rotating said gear and a doubletree movably mounted on the front hounds and connected with said gear and a stop for said doubletree secured to the front hounds, the connections between the cog-gear and the doubletree being slotted to receive the wrench-pin and guides for the rack depending from the doubletree.

9. In an automatic vehicle-brake, the combination with the brake-beam and the levers connected therewith, of clips adjustably mounted on the brake-beam, springs connecting the beam with the rear axle and means for adjusting the connections between said clips and levers, as set forth.

10. In an automatic vehicle-brake, the combination with the brake-beam and the levers connected therewith, of clips adjustably mounted on the brake-beam, springs connecting the beam with the rear axle and means for adjusting the connections between said clips and levers, and means for adjusting the tension of said springs.

11. In an automatic vehicle-brake, the combination with the brake-beam and the levers connected therewith, of clips adjustably mounted on the brake-beam, springs connecting the beam with the rear axle and means for adjusting the connections between said clips and levers, and means for adjusting the tension on said springs, said levers having their adjacent ends overlapped and slotted and an extension-bar connected therewith.

12. In an automatic vehicle-brake, the combination with the brake-beam and the levers connected therewith of clips adjustably mounted on the brake-beam, springs connecting the beam with the rear axle and means for adjusting the connections between said clips and levers, and means for adjusting the tension on said springs, said levers having their adjacent ends overlapped and slotted and an extension-bar connected therewith, the reach and guides thereon for the extension-bar.

In witness whereof I have hereunto set my hand in the presence of two witnesses.

JOHN W. ROWE.

Witnesses:
 HUGH M. STERLING,
 H. V. PFEIFFER.